Figure 1:
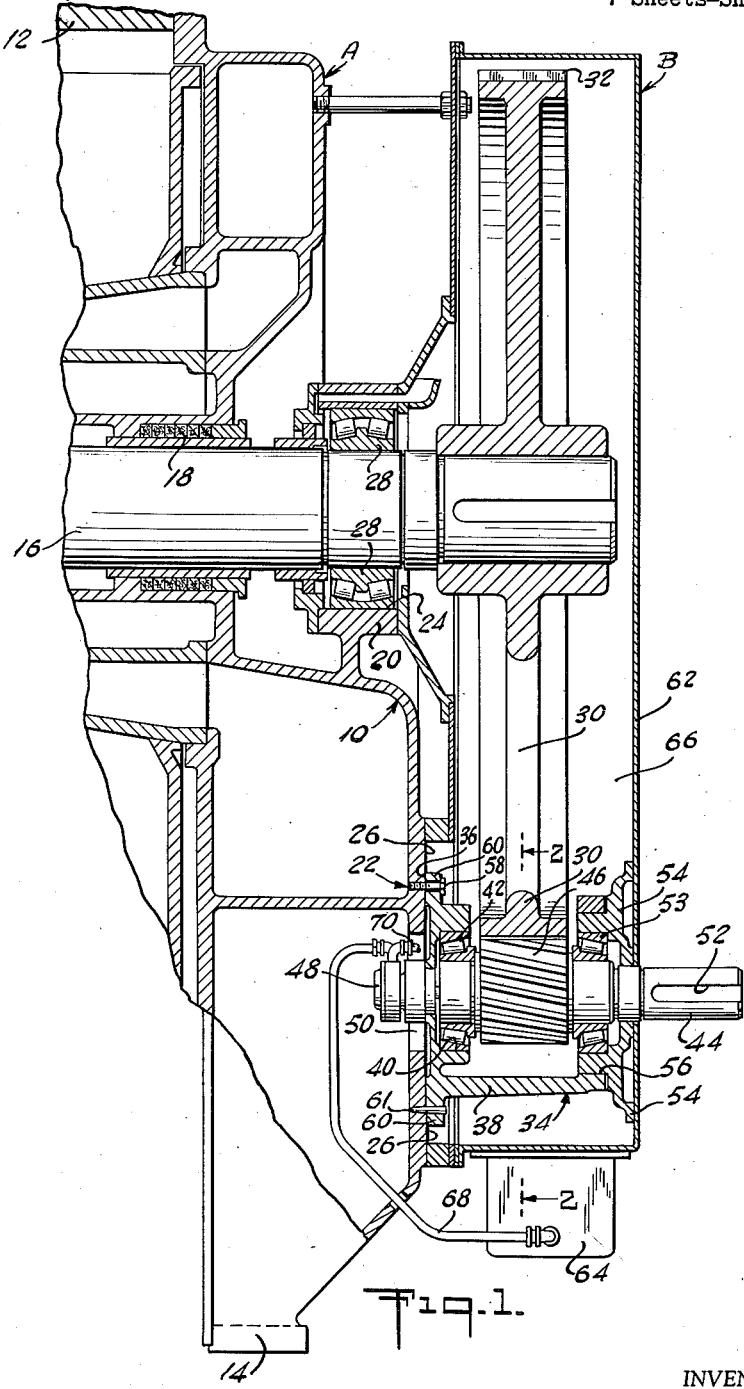

March 14, 1961 I. C. JENNINGS 2,974,538
POWER DRIVE CONSTRUCTION
Filed Feb. 28, 1958 7 Sheets-Sheet 1

INVENTOR.
IRVING C. JENNINGS
BY
Moses, Nolte, & Nolte
ATTORNEYS

March 14, 1961     I. C. JENNINGS     2,974,538
POWER DRIVE CONSTRUCTION

Filed Feb. 28, 1958     7 Sheets-Sheet 2

INVENTOR.
IRVING C. JENNINGS
BY
Moses, Nolte, & Nolte
ATTORNEYS

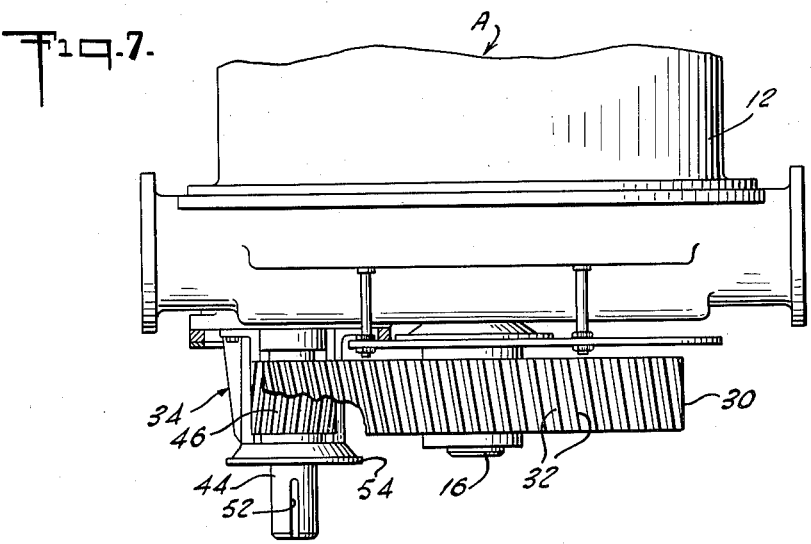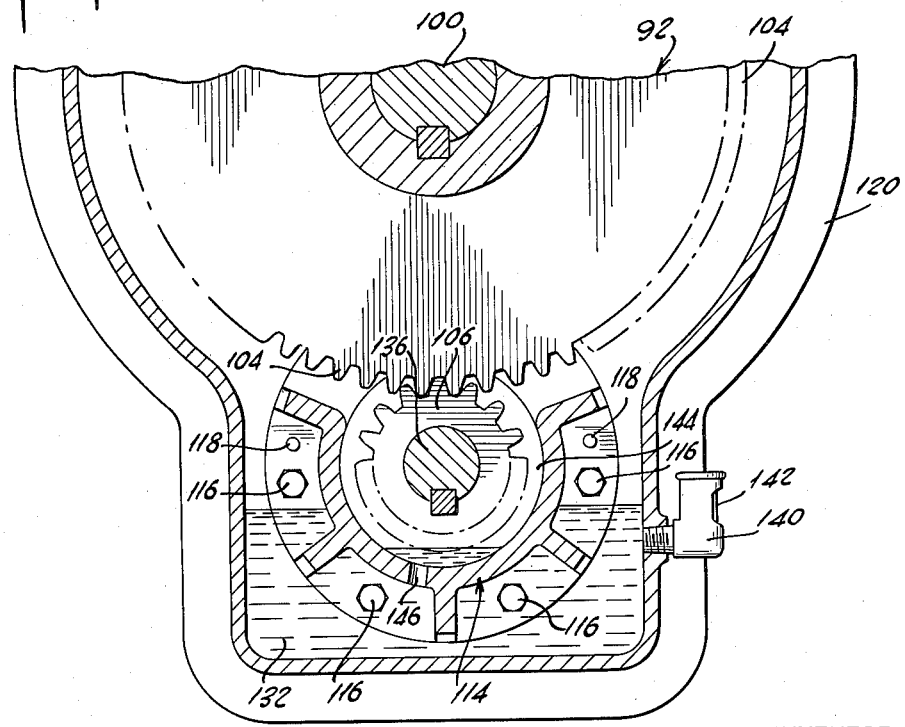

INVENTOR.
IRVING C. JENNINGS

United States Patent Office 2,974,538
Patented Mar. 14, 1961

2,974,538
POWER DRIVE CONSTRUCTION
Irving C. Jennings, South Norwalk, Conn.
Filed Feb. 28, 1958, Ser. No. 718,199
16 Claims. (Cl. 74—421)

The present invention relates in general to drive mechanisms and particularly to a new and useful power drive construction for slow-speed equipment such as vacuum pumps, compressors or the like, and to a method of construction of such power drive assemblies.

Many important considerations are involved in the selection of a suitable prime mover drive for a large-sized slow speed machine requiring horsepower input of high magnitude. For example, a large-sized vacuum pump or compressor will operate satisfactorily at approximately 180 r.p.m. and require about 250 horsepower to operate. It is impractical from the standpoint of cost to use a low speed direct drive electric motor prime mover.

If resort is had to belt drives, an electric prime mover would have to be of intermediate speed, and hence relatively expensive, and a large number of matched V-belts would have to be used, and would require periodic renewal. With belt drives, an increased floor space area is required. Similarly, with separate gear assemblies located between the apparatus and the prime mover, large floor space is required for the drive, and the separate gear units are expensive. In addition, separate speed-gearing units require the use of a flexible coupling between the gear and the apparatus receiving power, and this is an additional item of expense. Beside advantages of high expense and maintenance costs, there is the added disadvantage of assembly and alignment of a separate speed reducing unit, when the equipment is set up.

In accordance with the present invention, a slow-speed machine, such as a vacuum pump, is constructed with an arrangement of speed reduction gears at the driving end of the casing thereof. The end surface of the casing is machined with precision at right angles to the main end bearing support of the shaft of the apparatus, to permit easy assembly of suitable driving gears as part of the apparatus without incurring the difficulties mentioned above. The invention includes an arrangement whereby the driving gear is rotatably pre-positioned in a bracket. The bracket is machined with precision at one end to precisely right angles to the driving gear shaft, and this end is positioned against the end of the casing which is machined precisely at right angles to the bearing support of the main shaft of the apparatus. The driving gear on the bracket is then arranged to mate with a large gear on the shaft of the apparatus and positioned in correct driving relationship, and then the bracket is secured to the end of the casing.

The complete unit includes a speed gear reduction drive which takes up a minimum amount of work space and which is inexpensive to manufacture and assemble. The arrangement permits interchangeable use of gears to vary size and speed ratio, and the adjustability of the brackets permits small adjustments in gear positions to compensate for wear. Since the end casing of the apparatus itself carries the drive gears, the cover for the drive gears may be made very light and hence is inexpensive.

In instances where the apparatus itself is of substantially large diameter, the gears are preferably made similarly large in diameter to cut down the tooth load. Making the gears large permits the use of relatively narrow width gears, so that misalignment of the gears does not present a serious problem. In the preferred construction of the invention, the driven gear, affixed to the shaft of the apparatus, is mounted adjacent the main bearing of the equipment so that no outboard bearing is required to support the gear.

Accordingly, it is an object of this invention to provide an improved driving gear construction for large slow-speed rotating apparatus.

A further object of the invention is to provide an improved method for forming the end plate of an apparatus to accommodate a set of speed reduction gears which are positioned and aligned thereon in a novel manner.

A further object of the invention is to provide an improved bearing and end plate construction for slow-speed apparatus requiring a high-speed electric motor drive.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
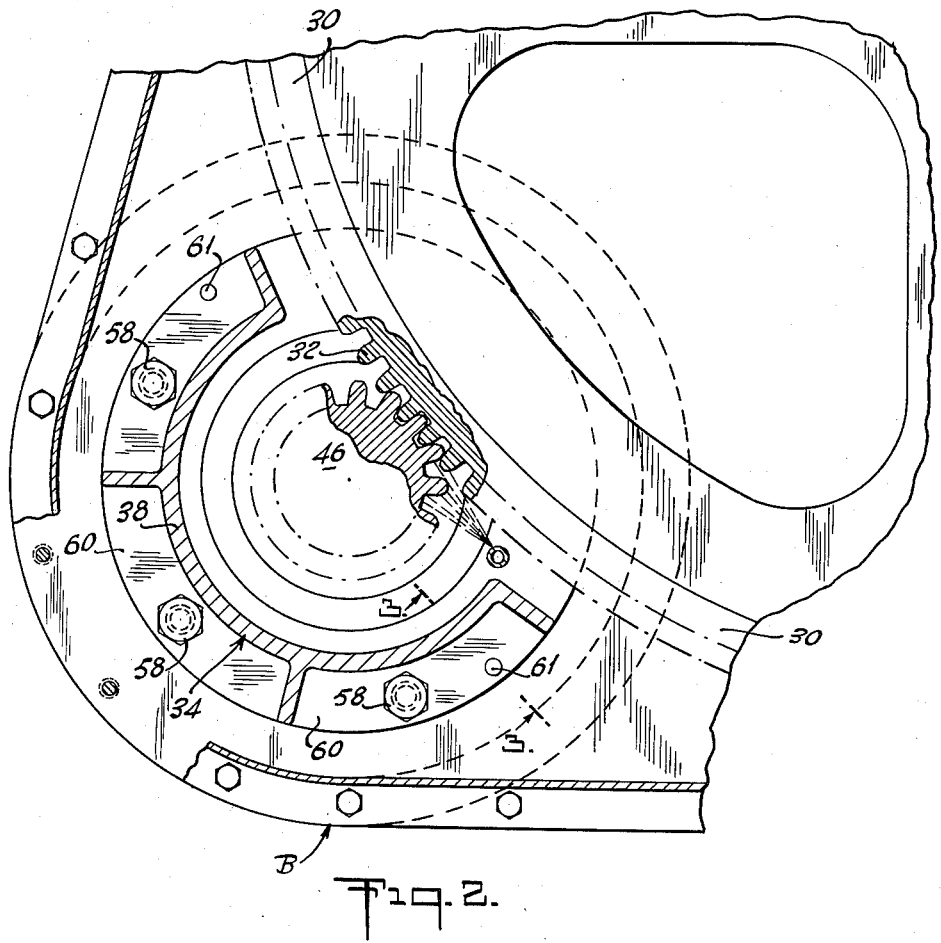
Figure 3:
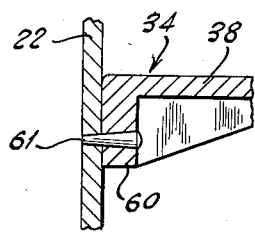
Figure 4:
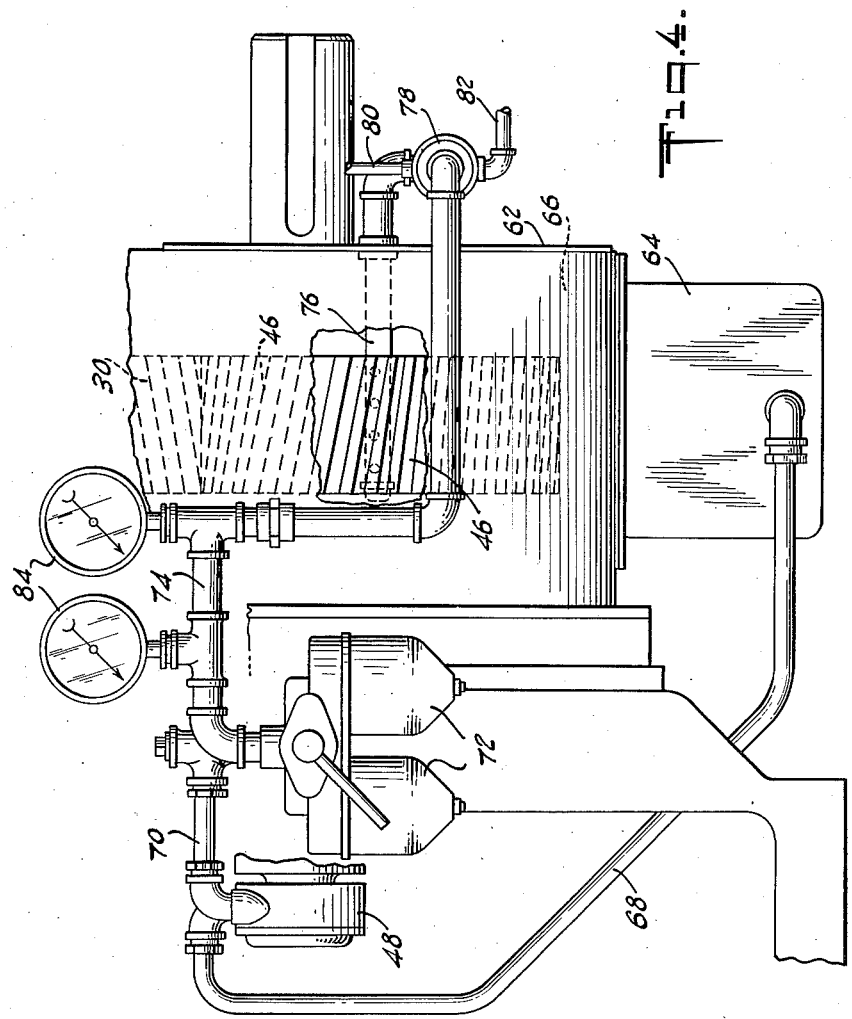
Figure 5:
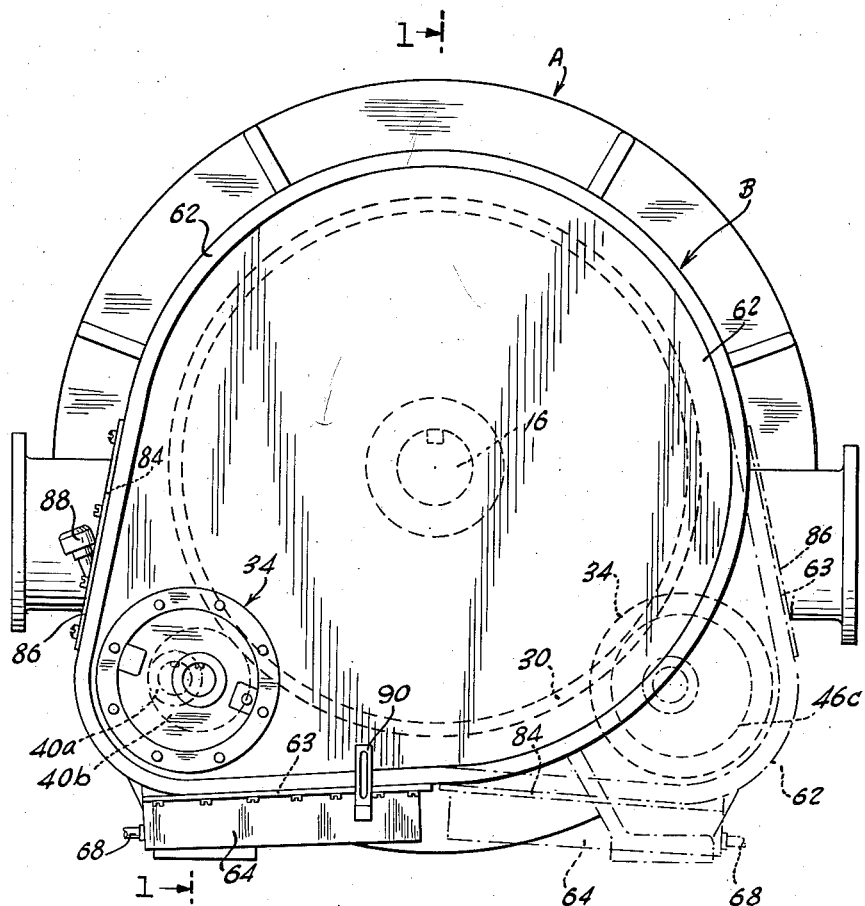
Figure 6:
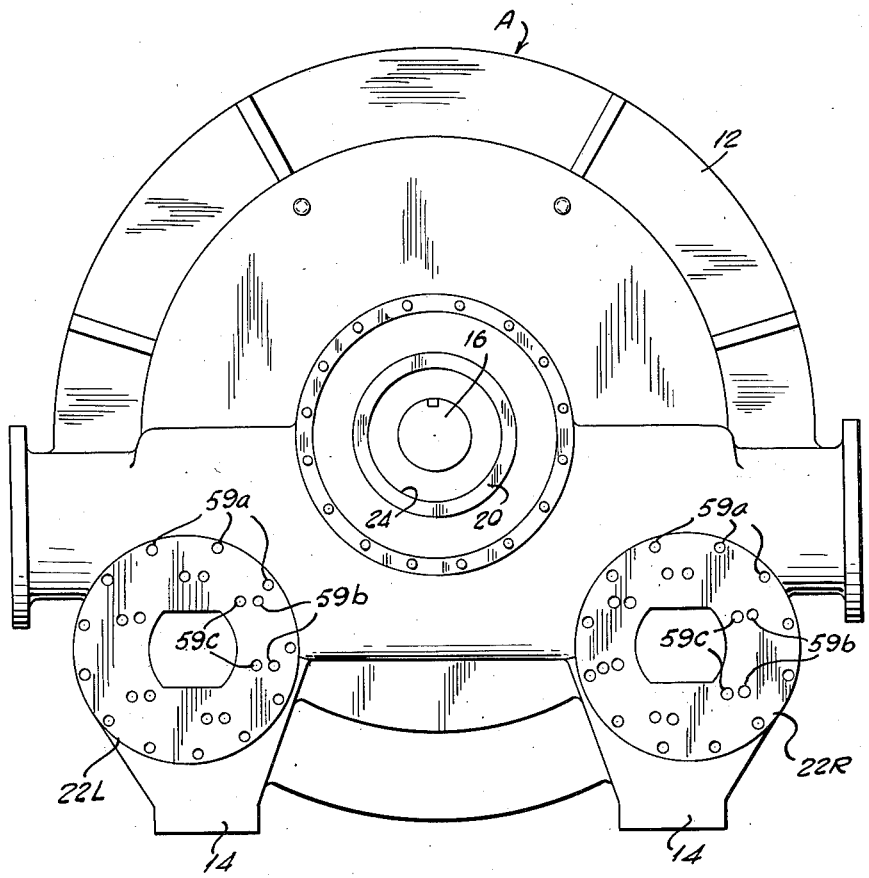
Figure 8:
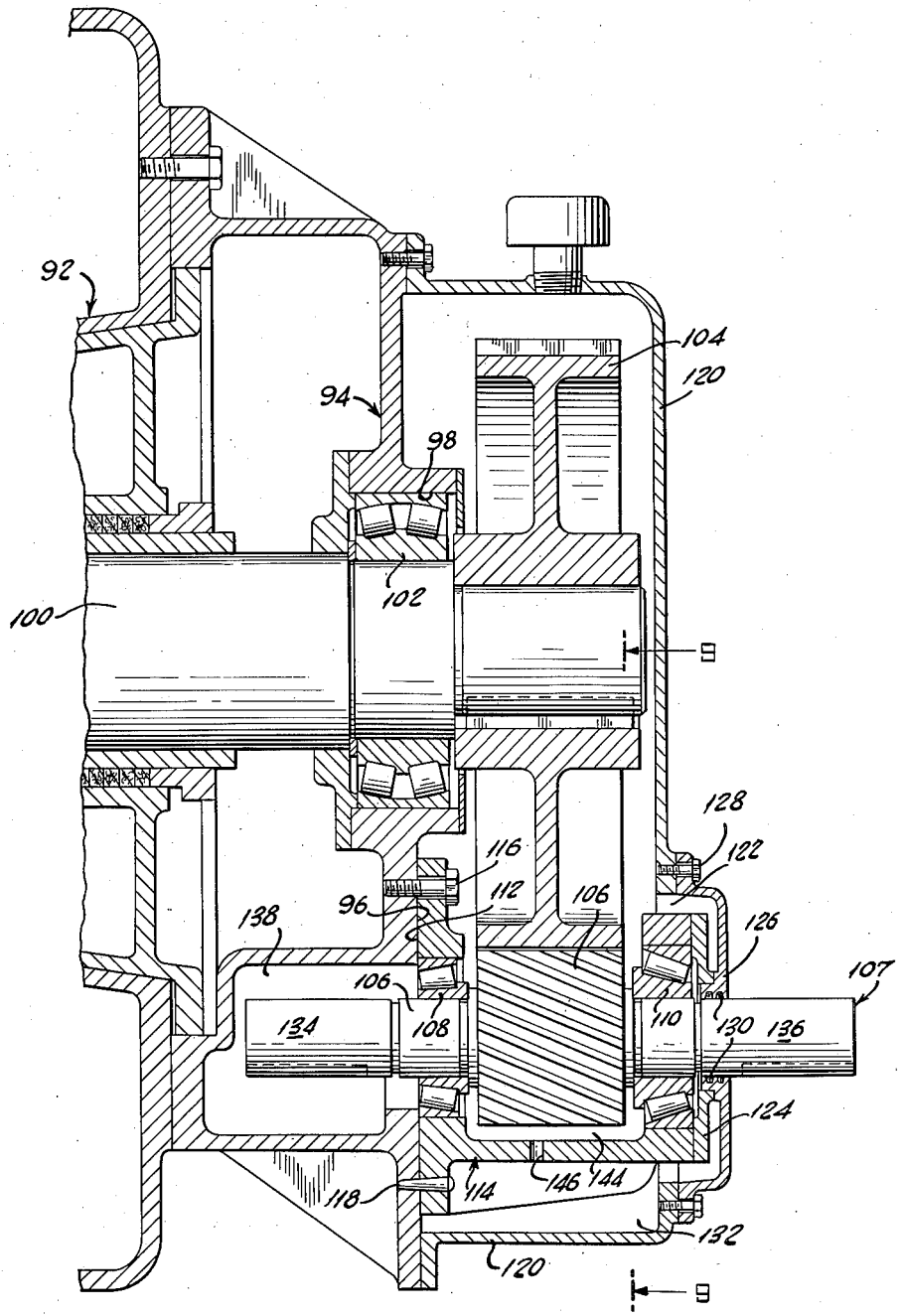

In the drawings:
Fig. 1 is a fragmentary section taken on the line 1—1 of Fig. 5 of a large pump having a speed gear drive constructed in accordance with this invention;
Fig. 2 is a detailed fragmentary section taken on the line 2—2 of Fig. 1;
Fig. 3 is a fragmentary section taken on the line 3—3 of Fig. 2;
Fig. 4 is a partial side elevation partly broken away of the speed gear construction, indicating the lubricating oil system;
Fig. 5 is an end elevation of the pump and speed gear apparatus illustrated in Fig. 1 and indicating left and right hand drive;
Fig. 6 is an end elevation similar to Fig. 5 but with the cover and driving gears removed;
Fig. 7 is a top plan view of the apparatus illustrated in Fig. 1 but with the cover removed;
Fig. 8 is a view similar to Fig. 1 of another embodiment of the invention, including an alternate lubrication system; and
Fig. 9 is a transverse vertical section taken on the line 9—9 of Fig. 8.

Referring to the drawings in particular, the invention as embodied therein includes a large slow-speed vacuum pump generally designated A on which there is incorporated an improved speed gear mechanism generally designated B. The vacuum pump A, in this instance, includes a slow-speed centrifugal pump designed to run efficiently at approximately 180 r.p.m. for an input horsepower requirement of 250 horsepower. It should be appreciated that the invention is particularly directed toward the speed gear mechanism B and the construction and arrangement of a casing bearing and end plate generally designated 10 of an apparatus such as, but not necessarily limited to, the large pump A.

Pump A includes a casing 12 supported on legs 14. The casing is provided with a hollowed central portion in which is rotatably mounted a main impeller shaft 16. The shaft 16 is mounted at each end on suitable bearings held in the casing 12 and extends through suitable packing 18 in the casing bearing and end plate 10 on the speed gear mechanism end of the pump A.

In accordance with the invention, the casing bearing and end plate 10 commonly called the head of such a pump, is made of a single piece, including an annular bearing support portion 20 and a lower machined base portion generally designated 22. The annular bearing support portion 20 and the machined base portion 22 are machined at the same time to effect a right angle relationship between an annular bearing support surface 24, of the bearing support portion 20, and a flat mounting surface 26, of the machined base portion 22. The shaft 16 is supported in bearings 28, and, due to the precision machining of the bearing support surface 24 and the precision machining of the bearing 28, the shaft will always be at right angles to the machined base portion 22.

The bearing 28 provides the only support at the speed gear end of the pump A for the shaft 16 and a large driven gear 30 affixed to the shaft. The gear 30 is chosen to have as large a diameter as possible commensurate with the size of the pump casing in order to effect a gear tooth size and spacing for the speed ratio desired, which will give a minimum tooth load on each of the teeth 32 of the gear. By purposely selecting a large gear for the pump drive, it is possible to use a very narrow depth gear, making slight misalignments not serious. A feature of the construction is that the bearing 28 is located near the end of the pump to support the gear 30 on the shaft 16, obviating the necessity for providing an additional outboard bearing, as would be the case if the gears were mounted in a separate housing.

The invention includes a driving pinion mounting bracket generally designated 34 having a precision machined face 36 adapted for positioning against the machined base portion 22 of the pump A. The bracket 34 includes a body portion 38 which defines ¾ of a cylinder and an end bearing receiving surface 40 which is precisely machined at right angles to the surface 36. The bearing receiving portion 40 is fitted with a roller bearing 42.

Rotatably mounted in the bearing 42 is a driving stub shaft 44 on which is affixed for rotation therewith a driving pinion 46. One end of the shaft 44 is provided with a lubricating oil pump 48 which extends through an opening 50 in the machined base portion 22. The opposite end of the shaft 44 is provided with a slot 52 to facilitate connection to a suitable prime mover drive such as an electric motor (not shown).

In accordance with the invention, the bracket 34 is positioned against the casing bearing and end plate 10 in the location of the machined base portion 22 and the pinion 46 is positioned to mesh with the gear 30. A roller bearing 53 is positioned on the outside end of the shaft 44, and supported on a filler collar 54 which rests against a machined surface 56 of the bracket 34. A plurality of bolts 58 extend through oversized openings on a flange 60 of the bracket 34 and are threaded into the casing machined base portion 22, but not fully tightened to loosely secure the bracket to the bearing and end plate 10.

Three separate sets of threaded holes 59a, 59b and 59c (Fig. 6) are drilled into the casing 12 at the locations of a left hand machined base portion 22l and a right hand base portion 22r, to accommodate driving pinions of varying size.

The pinion 46 is then accurately positioned to mesh with the gear 30 by moving the bracket 34 sufficiently on the oversized bolt holes to effect correct mating gear alignment. Once proper alignment is obtained, the bracket is fixed in position by dowel pieces 61 which extend through the bracket and are secured in the casing bearing and end plate 10.

The speed gears 30 and 46 and their associated mechanisms are covered by a cover plate 62 which is bolted to the casing 12 of the pump A (see Figs. 1, 2, 4 and 5). The cover plate 62 is provided with an opening 63 to receive a lubricating oil sump 64. The lubricating oil sump 64 is secured to the bottom of the cover plate 62 and is in communication with the inside lower end of a speed gear compartment 66 which is enclosed by the cover plate. The pump 48 is arranged to take suction from the lubricating oil sump 64 through a conduit 68 and discharge it through a conduit 70, strainers 72 and a conduit 74, to a perforated discharge pipe 76 located in the chamber 66 and positioned to discharge oil onto the mating gears 30 and 46. A small cooler 78 is provided in the conduit 74 to cool the oil before it reaches the gears. The cooling water is circulated through an inlet conduit 80 and discharge through a conduit 82 connected to the cooler 78. Suitable gauges 84 are provided to indicate lubricating oil operating temperatures and pressures.

In the embodiment shown in Figs. 5 and 6 provision is made to mount a pinion gear bracket similar to the bracket 34 on either side of the pump center line on either the machined base 22l or 22r. The cover plate 62 is eccentric with the shaft center line so that it can be reversed from the position indicated in solid lines in Fig. 5 to the position indicated in dotted lines. In this embodiment, the casing bearing and end plate 10 is accurately machined at both sides of the center line of the shaft 16, forming an accurately machined flat surface for pinions ranging from a small pinion 46a to a large pinion 46b on one side, and for a range of pinion diameter sizes including a large pinion 46c on the opposite side. The cover 62 is provided with a cover plate side opening 84. The opening 84 is exactly the same size as the opening 63 in the cover connecting the lube oil sump 64.

The arrangement is such to permit location of the pinion 46 to the left of the center line of the shaft 16 in which case the cover 62 is positioned as shown in the solid line. In the event that the drive is located on the right-hand side, a pinion 46c would be positioned as shown in the dotted outline and the cover 62 would be moved around to bring the opening 84 to a bottom right-hand location, along with the lubricating oil sump 64 which will be secured thereto. The opening 63 is positioned above the pinion 46c and now defines an inspection plate opening covered by the plate 86.

With the arrangement indicated in Figs. 5 and 6, it is possible to locate any desired one of a plurality of different sized driving pinions on either side of the center line of the shaft 16 by using any one of the three sets of bolt holes 59a, 59b and 59c, as indicated. For example, it is a simple matter to locate the bracket 34 with its driving pinion positioned therein in driving relationship to the gear 30, when using either a large pinoin such as 46b for a driving electric motor speed of 1200 r.p.m., or using a small pinion 46a for a driving electric motor speed of 1800 r.p.m. In the embodiment shown, intermediate adjustment can be made to accommodate a driving pinion for a diving speed of 1500 r.p.m., and, of course, the invention principles can be utilized to permit operation with substantially any speed ratio desired. Associated with the adjustable cover plate 62 are an interchangeably positionable oil breather cap 88 and a level indicating gauge 90. When the cover is moved to the dotted outline position indicated in Fig. 5, the location of these two elements are interchanged in their mounting in the cover plate. All of these features provide a most versatile arrangement for the speed reducing drive mechanism of the apparatus.

The invention is equally applicable to smaller sized equipment such as a pump generally designated 92 in Figs. 8 and 9. A combination bearing bracket and pinion gear mounting base generally designated 94 is secured to one end of the pump 92 as by bolting. As in the previous embodiments, the bearing bracket and pinion gear mounting base 94 are machined simultaneously to provide a mounting base surface 96 which is at precisely right angles to a bearing support surface 98. A main shaft 100 is positioned in a roller bearing 102 for rotation thereon, the bearings being accurately positioned on the surface 98. A large gear 104 is affixed to the end of the shaft 100 outboard of the roller bearing 102.

A pinion gear 106 is affixed to an elongated stub shaft generally designated 107 and is rotatably mounted in accurately aligned bearings 108 and 110. The bearings 108 and 110 are arranged to support the shaft 107 at precisely right angles to a machined surface 112 of a pinion mounting bracket generally designated 114.

The pinion gear 106 is located in meshing relationship with the gear 104 and the bracket 114 is positioned adjacent the combination bearing bracket and pinion gear mounting base 94 with the surface 112 adjacent the surface 96. The bracket 114 is initially aligned and bolts 116 are set up lightly to secure the bracket to the combination bearing bracket and pinion gear mounting base 94. Final adjustment in the positioning of the pinion 106 and the gear 104 are made and then the bracket is permanently positioned securing it with dowel pins 118.

A cover piece 120 is secured to the combination bearing bracket and pinion gear mounting base 94 and is provided with a suitable opening 122 for the pinion mounting bracket 114. A plate 124 is secured to the mounting bracket 114, and a cap 126 is aligned therein by rabbeting and adjustably positioned to the cover piece 120 and secured thereto by bolts 128. The plate 124 is provided to absorb any end thrust resulting from the rotation of the parts. The cap 126 is closely fitted to the shaft 107 and is provided with packing seals 130 to retain oil within an oil sump 132 formed at the bottom of the cover piece 120.

The pinion shaft 107 is doubly extended, i.e., it has similar shaft extensions 134 and 136 which extend outwardly from each side of the pinion gear 106. The shaft extension 134 is positioned within a compartment 138 formed in the combination bearing bracket and pinion gear mounting base 94.

Referring to Fig. 9, oil is supplied to the oil sump 132 through a filler chamber 140 connected to the sump. The oil level is usually kept to a height indicated by a marking intermediate a sight glass 142 on the filler chamber 140. The oil in the sump 132 is normally prevented from entering a chamber 144 defined by the bracket 114. However, a small hole 146 is drilled through the bottom wall of the bracket 114 to permit small quantities of oil to enter the chamber 144 and to lubricate the gears 104 and 106 (Figs. 8 and 9). The quantity of oil which enters the chamber 144 is not sufficient to cause churning of the oil by the rotation of the pinion 106.

Thus the invention provides a means for readily adapting slow speed apparatus for connection to a high speed drive. By precisely machining the main bearing support and cover to provide a perpendicular relationship between the bearing support and a mounting base for the drive gear connection, it is possible to obtain many unusual advantages. By providing a compact speed-gear drive mounted directly on the apparatus requiring power, many of the problems encountered in the erection of the equipment and alignment with its prime mover are obviated. The equipment becomes very versatile and can be used with many different types and arrangements of power drive. Provision can be made for either right-hand or left-hand drive, and provision can be made for an easy change or substitution of the pinion driving gear to effect a change of speed ratio. The invention arrangement permits realignment of the driving gear after wear and reverse positioning to effect longer life of the mating gears.

The invention provides means for incorporating a gear speed reduction drive on standard pieces of equipment such as pumps or compressors with very little change in the construction of these devices. A material reduction in parts, and hence in cost, is effected and the expense of assembly and manufacture is greatly reduced. To alter a conventional pump it is only necessary to accurately machine the end casing to provide a support for an accurately machined driving pinion support bracket. Since the bracket may be adjustably positioned in the end casing, each of the speed gears involved may be readily changed in size to give different speed ratios. If the gears become roughened or exhibit excessive wear due to oil failure or long use, they can be recut and reassembled, with proper clearance of mating teeth effected by moving the pinion support bracket.

Since the gear cover is not required to support gears as would be the case if a separate drive were required, this piece of equipment can be made very light in weight, and subsequently is inexpensive.

While a specific embodiment of the invention has been shown and described in detail to illustrate the application of the invention principles, it will be understood that the invention may be embodied otherwise without departing from such principles.

I claim:

1. An attachment for use in driving the shaft of an apparatus, said apparatus having an end casing with a bearing for rotatably supporting said shaft, and a gear affixed to said shaft outboard of said end casing comprising, a driving pinion mounting bracket including spaced bearings, a driving pinion rotatably mounted between said bearings, and means on a face of said bracket and said end casing for supporting said bracket on said end casing for driving meshing engagement of said gear and said driving pinion with the shaft of said apparatus and said pinion in parallel relationship.

2. An attachment according to claim 1, wherein said means for supporting said bracket on said end casing includes a substantially cylindrical driving gear mounting base defined on a face of said end casing on one side of said shaft and including a plurality of concentric sets of threaded openings for facilitating the bolting of driving pinion brackets of various sizes thereon.

3. An attachment according to claim 1, wherein said means for supporting said bracket on said casing includes a plurality of tapered openings on said bracket and said casing, a dowel positioned in said opening, said bracket being pivotal about said dowel support for alignment of said pinion and said gear, and means for bolting said bracket to said casing after said bracket has been aligned for meshing engagement of said gears.

4. An attachment according to claim 2, wherein said means for supporting said bracket on said end casing includes at least two driving gear mounting bases formed at right angles to said bearing support and located to permit mounting of said bracket in a position for driving engagement of said driving pinion means and said gear on either side of the vertical center line of said shaft.

5. An attachment according to claim 4, including a symmetrical speed gear cover, and fastening means to permit said cover to be secured in a location to enclose said driving pinion means when located to the left of said shaft center line and to permit relocation of said cover to enclose said driving pinion means when it is arranged to the right of said shaft center line.

6. An attachment according to claim 5, wherein said cover is provided with an interchangeable inspection opening and cover and a lubrication oil opening and sump.

7. An attachment according to claim 1, including means defining an oil sump below said pinion driving means and said gear, pump means driven by said driving pinion means to direct oil from said sump to said driving pinion means and said gear.

8. An attachment according to claim 7, including means associated with said pump means to cool said lubricating oil.

9. An end cover for a slow speed apparatus such as a pump or the like, having a bearing support portion formed on the cover to support the shaft of the apparatus, and a driving pinion mounting portion machined directly on said cover precisely at right angles to said bearing support portion at a location on said cover at one side of said bearing of support portion to permit mounting of a driving pinion bracket thereon, a driving pinion bracket having spaced bearings, a driving pinion support on said bearings, and means to support said driving pinion bracket on the mounting portion of said cover in a location to drive a gear affixed to the shaft by the apparatus.

10. An end cover according to claim 9, including a driving pinion mounting portion located on each side of the center line of said bearing support.

11. An end cover according to claim 9, wherein said end cover is recessed in the area of said driving pinion mounting portion to define a driving pinion shaft chamber therein, said mounting bracket having a surface in the same plane as, and positioned against, said base portion, a pinion shaft rotatable about its axis, said driving pinion mounted intermediate said shaft for rotation therewith, said shaft axis being positioned at right angles to said mounting bracket surface and one end of said shaft being positioned in said chamber.

12. An end cover according to claim 11, including an oil reservoir below said bracket, and means in said bracket to admit a small quantity of oil into said bracket into contact with said driving pinion.

13. A speed gear drive for a relatively slow speed apparatus such as a compressor, pump or the like comprising an end casing for said apparatus, a central bearing mount for said apparatus formed in said end casing, a main shaft rotatably mounted on said bearing mount, a gear on said shaft to rotate the latter arranged outboard of said bearing mount, a driving gear mounting base formed directly on the outside face of said end casing adjacent said gear and located in a spaced predetermined position from said bearing mount and in a plane precisely at right angles to said bearing mount and to one side of said shaft, a pinion mounting bracket having a flat surface positioned on said mounting base and secured to said end casing, and gear driving means positioned in said mounting bracket and mounted for rotation at right angles to said flat surface thereof and in meshing engagement with said gear.

14. An apparatus according to claim 13, wherein said bracket may be adjustably positioned on said casing base portion whereby to align said pinion driving means with said gear.

15. A method for assemblying a speed-gear driving mechanism to an apparatus having a rotatable main shaft comprising forming an end cover for said apparatus by machining a bearing surface for said main shaft and while said cover is still set up for the first machining operation, machining a flat speed-gear bracket-supporting base on the outside surface of said end cover at precisely right angles to the axis of said bearing support, machining a speed gear supporting bracket with a mounting end face cut precisely perpendicular to the axis of gear-supporting bearings therein and assemblying said gear bracket to said housing with the end face positioned on the machined base of said end cover, and positioning said bracket to align a gear therein with a gear affixed to the main shaft of said apparatus outside of said cover member.

16. A method of manufacturing an end cover for apparatus including a rotatable shaft such as a pump, comprising, machining a bearing surface for said shaft, and while said cover is still set up for the first machining operation machining at precisely right angles to said shaft bearing surface, a bearing surface for a speed gear supporting bracket on the end face of said cover at one side of said shaft.

References Cited in the file of this patent
UNITED STATES PATENTS

| | | |
|---|---|---|
| 1,522,068 | Morgan | Jan. 6, 1925 |
| 1,526,333 | Gilbert | Feb. 17, 1925 |
| 1,554,081 | Garrett | Sept. 15, 1925 |
| 1,604,401 | Fisher | Oct. 26, 1926 |
| 1,814,311 | Harvey | July 14, 1931 |
| 2,176,207 | Christensen | Oct. 17, 1939 |
| 2,214,170 | LeTourneau | Sept. 10, 1940 |
| 2,358,445 | Cone | Sept. 19, 1944 |
| 2,612,788 | Christian | Oct. 7, 1952 |
| 2,670,697 | Meakin | Mar. 2, 1954 |

UNITED STATES PATENT OFFICE
CERTIFICATION OF CORRECTION

Patent No. 2,974,538

March 14, 1961

Irving C. Jennings

It is hereby certified that error appears in the above numbered patent requiring correction and that the said Letters Patent should read as corrected below.

Column 7, line 3, after "bearing" strike out "of".

Signed and sealed this 1st day of August 1961.

(SEAL)
Attest:

ERNEST W. SWIDER
Attesting Officer

DAVID L. LADD
Commissioner of Patents